United States Patent
Lee et al.

(10) Patent No.: US 8,831,862 B2
(45) Date of Patent: Sep. 9, 2014

(54) METHOD AND APPARATUS FOR PROVIDING PUBLIC TRAFFIC INFORMATION

(75) Inventors: Joon Hwi Lee, Seoul (KR); Chu Hyun Seo, Seoul (KR); Mun Ho Jung, Seongnam-si (KR); Seung Won Kim, Seoul (KR)

(73) Assignee: LG Electronics Inc., Seoul (KR)

( * ) Notice: Subject to any disclaimer, the term of this patent is extended or adjusted under 35 U.S.C. 154(b) by 1426 days.

(21) Appl. No.: 12/063,253

(22) PCT Filed: Jul. 26, 2006

(86) PCT No.: PCT/KR2006/002934
§ 371 (c)(1),
(2), (4) Date: Aug. 12, 2008

(87) PCT Pub. No.: WO2007/018353
PCT Pub. Date: Feb. 15, 2007

(65) Prior Publication Data
US 2009/0125218 A1    May 14, 2009

Related U.S. Application Data

(60) Provisional application No. 60/706,770, filed on Aug. 10, 2005, provisional application No. 60/733,181, filed on Nov. 4, 2005, provisional application No. 60/804,553, filed on Jun. 12, 2006.

(30) Foreign Application Priority Data
Nov. 14, 2005    (KR) .................. 10-2005-0108734

(51) Int. Cl.
| | | |
|---|---|---|
| G06F 19/00 | (2011.01) |
| G06G 7/70 | (2006.01) |
| G06G 7/76 | (2006.01) |
| G06G 1/00 | (2006.01) |
| G08G 1/09 | (2006.01) |
| G06Q 30/02 | (2012.01) |

(52) U.S. Cl.
CPC ............... G08G 1/092 (2013.01); G06Q 30/02 (2013.01)
USPC ............................ 701/117; 701/118; 340/994

(58) Field of Classification Search
USPC .................... 701/117–119; 340/988, 989, 994
See application file for complete search history.

(56) References Cited

U.S. PATENT DOCUMENTS

| | | | |
|---|---|---|---|
| 5,736,490 A | 4/1998 | Bouffet et al. | |
| 7,646,774 B2 * | 1/2010 | Kim et al. ............... | 370/395.64 |

(Continued)

FOREIGN PATENT DOCUMENTS

| | | |
|---|---|---|
| GB | 2378560 A | 2/2003 |
| JP | 2001-283385 A | 10/2001 |

(Continued)

OTHER PUBLICATIONS

European Broadcasting Union, Transport Protocol Expert Group (TPEG), TPEG specification—Part 5: Public Transport Information Application, TPEG-PTI_3.0/001, BPN 027-5 Dec. 19, 2002.*

(Continued)

*Primary Examiner* — Jeffrey Shapiro
(74) *Attorney, Agent, or Firm* — Fish & Richardson P.C.

(57) ABSTRACT

Disclosed herein are a method and apparatus for providing traffic information for a public transportation means, such as a bus, and utilizing the provided information. A method of encoding traffic information according to the present invention creates information about a bus stop, creates identification information for respective bus routes passing through the bus route and information about arrival time, creates identification information indicating that the type of traffic information to be encoded is stop-based public traffic information, and constructs a message segment including the created information. A sequence of multiple message segments constructed as described above are wirelessly transmitted.

49 Claims, 17 Drawing Sheets

(56) References Cited

U.S. PATENT DOCUMENTS

| | | | |
|---|---|---|---|
| 7,880,645 B2* | 2/2011 | Park | 340/994 |
| 2001/0049581 A1* | 12/2001 | Kane et al. | 701/202 |
| 2003/0033077 A1 | 2/2003 | Watanabe | |
| 2004/0255297 A1* | 12/2004 | Horstemeyer | 718/100 |
| 2006/0105787 A1* | 5/2006 | Seo | 455/456.5 |
| 2006/0106536 A1* | 5/2006 | Park | 701/208 |
| 2006/0267794 A1* | 11/2006 | Lee et al. | 340/905 |
| 2008/0030379 A1* | 2/2008 | Park | 340/994 |
| 2008/0068221 A1* | 3/2008 | Park | 340/994 |
| 2009/0055089 A1* | 2/2009 | Lee et al. | 701/202 |
| 2009/0125218 A1* | 5/2009 | Lee et al. | 701/117 |
| 2010/0253549 A1* | 10/2010 | Kim et al. | 340/994 |
| 2010/0259421 A1* | 10/2010 | Kim et al. | 340/994 |
| 2010/0271240 A1* | 10/2010 | Kim et al. | 340/994 |
| 2010/0318285 A1* | 12/2010 | Kim et al. | 701/117 |

FOREIGN PATENT DOCUMENTS

| | | |
|---|---|---|
| KR | 10-2001-0036842 A | 5/2001 |
| KR | 10-2001-036842 A | 5/2001 |
| KR | 10-2002-037311 A | 5/2002 |
| KR | 10-2002-041171 A | 6/2002 |
| KR | 10-2004-003807 A | 1/2004 |
| KR | 10-2004-0018646 A | 3/2004 |
| KR | 10-2004-046606 A | 6/2004 |
| WO | WO 2007/018353 A1 | 2/2007 |

OTHER PUBLICATIONS

European Broadcasting Union, Transport Protocol Expert Group (TPEG), TPEG specification—Part 6: Location Referencing for Applications, TPEG-LOC_3.0/001, BPN 027-6 Oct. 29, 2002.*

European Search Report dated Feb. 4, 2011 for Application No. 06769302.8, 7 pages.

Mexican Office Action dated Jun. 16, 2010 for Application No. MX/A/2008/002031, 6 pages, with English Translation.

International Search Report and Written Opinion dated Nov. 3, 2006 for Application No. PCT/KR2006/002934, 7 pages.

XP 002419511; Bev Marks; "TPEG—Standardized at last . . . but this is only the beginning", EBU Technical Review, Oct. 2005, pp. 1-14.

XP 002614931; "TPEG—What is it all about?", European Broadcasting Union, The TPEG Project, Information society Technologies, Jul. 2003, pp. 1-26.

Korean Notice of Allowance dated Aug. 28, 2012 for Application No. 10-2005-0108734, with English translation, 4 pages.

Chinese Office Action dated Mar. 30, 2011 for Application No. 200680034339.7, with English Translation, 18 pages.

Korean Office Action dated Nov. 24, 2011 for Application No. 10-2005-0108734, 7 pages.

* cited by examiner

| | |
|---|---|
| <pti_component(A0)>:= | : Transport Mode |
| <intunti>(id), | : identifier, id=0xA0 hex |
| <intunli>(n), | : component data length (n) in byte |
| <pti01>(transport_mode), | : TPEG table pti01_7 : bus service |

| | |
|---|---|
| < pti_component(A1)>:= | : Service information |
| <intunti>(id), | : identifier, id= 01 hex |
| <intunli>(n), | : component data length (n) in byte |
| m * <service_information_component()>; | : Service information components |

FIG. 4C

```
< service_information_component(01)>:=: Transport service identification
<intunti>(id),                : identifier, id= 01 hex
<intunli>(n),                 : component data length (n) in byte
m * <transport_service_identification_component()>; : Transport service
                                identification components
```

FIG. 4D

```
<transport_service_identification_component(01)>:= Transport service id
<intunti>(id),                :identifier, id=0x01 hex
<intunli>(n),                 : component data length (n) in byte
<pti14>(transport_information_type),Transport information type, TPEG table
                                pti14_4
<short_string>;               :carrying 32bit line ID
```

FIG. 4E

```
<service_information_component(07)>:= : Route description
<intunti>(id),                : identifier, id = 07 hex
<intunli>(n),                 : component data length (n) in byte
m * <route_description_component()>;   : Route description components
```

FIG. 4F

```
<route_descrpiton_component(02)>:=Location container
<intunti>(id),                : identifier, id = 02 hex
<intunli>(n),                 : component data length (n) in byte
<pti16>(scheduled_predicted), : Scheduled or predicted
<pti28>(time_type),           : Time type, TPEG table pti28_1 (arrival)
m * <time_type_component()>;
```

FIG. 4G

| | |
|---|---|
| < time_type_component(01)>::= | time instance |
| \<intunti>(id), | : identifier, id = 01hex |
| \<intunti>(n), | : component data length (n) in byte |
| \<time_local>; | : time including local offset |

FIG. 4H

| | |
|---|---|
| < time_type_component(02)>::= | Interval time |
| \<intunti>(id), | : identifier, id = 02 hex |
| \<intunti>(n), | : component data length (n) in byte |
| \<intunti>; | : Interval time |

FIG. 4I

| | |
|---|---|
| < time_type_component(03)>::= | Service day type |
| \<intunti>(id), | : identifier, id = 03 hex |
| \<intunti>(n), | : component data length (n) in byte |
| \<intunti>; | : Interval time |
| \<pti34>(service_day_type); | : Service day type |

FIG. 4J

| | |
|---|---|
| <route_description_component(03)>::=Timetable type | |
| \<intunti>(id), | : identifier, id = 03 hex |
| \<intunli>(n), | : component data length (n) in byte |
| \<pti33>(timetable_type); | : Timetable type, TPEG table pti33 |

FIG. 4K

| | |
|---|---|
| <route_description_component(04)>::=Location container | |
| \<intunti>(id), | : identifier, id = 04 hex |
| \<intunli>(n), | : component data length (n) in byte |
| \<pti15>(route_description_type) | Route description type, TPEG table pti15 |
| \<tpeg_loc_container>; | : loc03_45 Node ID (transit node ID) |

FIG. 4L

| | |
|---|---|
| <pti_component(A2)>:= | : Message report type |
| <intunti>(id), | : identifier, id = 0xA2 hex |
| <intunli>(n), | : component data length (n) in byte |
| <pti27>(message_report_type), | : TPEG table station/terminal information(pti27_2) |

FIG. 4M

| | |
|---|---|
| <pti_component(A3)>:= | : Additional information |
| <intunti>(id), | : identifier, id = 0xA3 hex |
| <intunli>(n), | : component data length (n) in byte |
| <pti30>(function_type), | : TPEG table pti30_1 : URL of transportation information provider |
| <loc41>(language_code), | : Language code |
| <short_string>; | : Additional information |

FIG. 5A

| | |
|---|---|
| <tpeg_loc_container>:= | : |
| <loc41> | : basic language table <loc41_65> Korean |
| m * <tpeg_loc_component()>; | : TPEG-Loc components |

FIG. 5B

| | |
|---|---|
| <tpeg_loc_component(00)>:= | : Location co-ordinates component |
| <intunti>(id), | : identifier, id = 00 hex |
| <intunli>(n), | : component data length (n) in byte |
| <loc01>, | : Location type, <loc01_2> nodal area |
| m * <co-ordinates_component()>; | : Location co-ordinates components |

FIG. 5C

| | |
|---|---|
| <co-ordinates_component(00)>:=Mode type list | |
| <intunti>(id), | : identifier, id = 00 hex |
| <intunti>(n), | : component data length (n) in byte |
| m * <mode_component()>; | : Mode of transport components |

FIG. 5D

| | |
|---|---|
| <mode_component(00)>:= | : Mode of transport |
| <intunti>(id), | : identifier, id = 00 hex |
| <intunti>(n), | : component data length (n) in byte |
| <loc05>, | : Mode of transport, <loc05_6> bus |

FIG. 5E

| | |
|---|---|
| <co-ordinates_component(01)>:=WGS 84 | |
| <intunti>(id), | : identifier, id = 01 hex |
| <intunti>(n), | : component data length (n) in byte |
| <intsilo>(longitude), | : longitude (in 10 micro-degrees units) |
| <intsilo>(latitude), | : altitude (in 10 micro-degrees units) |
| m * <WGS84_component()>; | : WGS 84 components |

FIG. 5F

| | |
|---|---|
| <co-ordinates_component(02)>:=Descriptor | |
| <intunti>(id), | : identifier, id = 02 hex |
| <intunti>(n), | : component data length (n) in byte |
| <loc03>, | : Descriptor type, |
| <short_string>(name), | : Descriptor : carrying Node ID or bus stop ID |
| m * <descriptor_component()>; | Descriptor components |

| | |
|---|---|
| `<pti_component(A0)>:=` | : Transport Mode |
| `<intunti>(id),` | : identifier, id=0xA0 hex |
| `<intunli>(n),` | : component data length (n) in byte |
| `<pti01>(transport_mode),` | : TPEG table pti01_7 : bus service |

| | |
|---|---|
| `< pti_component(A1)>:=` | : Service information |
| `<intunti>(id),` | : identifier, id= 01 hex |
| `<intunli>(n),` | : component data length (n) in byte |
| `m * <service_information_component()>;` | : Service information components |

FIG. 8C

```
< service_information_component(01)>:=: Transport service identification
<intunti>(id),              : identifier, id= 01 hex
<intunli>(n),               : component data length (n) in byte
m * <transport_service_identification_component()>; : Transport service
                                        identification components
```

FIG. 8D

```
<transport_service_identification_component(01)>:= Transport service id
<intunti>(id),              : identifier, id=0x01 hex
<intunli>(n),               : component data length (n) in byte
<pti14>(transport_information_type),Transport information type, TPEG table
                            pti14_4
<short_string>;             : carrying 32bit line ID
```

FIG. 8E

```
<service_information_component(07)>:= : Route description
<intunti>(id),                          : identifier, id = 07 hex
<intunli>(n),                           : component data length (n) in byte
m * <route_description_component()>;    : Route description components
```

FIG. 8F

```
<route_descrpiton_component(02)>:=Location container
<intunti>(id),                  : identifier, id = 02 hex
<intunli>(n),                   : component data length (n) in byte
<pti16>(scheduled_predicted),   : Scheduled or predicted
<pti28>(time_type),             : Time type, TPEG table pti28_1 (arrival)
m * <time_type_component()>;
```

FIG. 8G

```
< time_type_component(03)>:= Service day type
<intunti>(id),              : identifier, id = 03 hex
<intunti>(n),               : component data length (n) in byte
<intunti>;                  : Interval time
<pti34>(service_day_type);  : Service day type
```

FIG. 8H

```
< time_type_component(04)>:= Travel time
<intunti>(id),              : identifier, id = 04 hex
<intunti>(n),               : component data length (n) in byte
<intunti>;                  : travel time
```

FIG. 8I

```
< time_type_component(05)>:= Speed Acceleration
<intunti>(id),              : identifier, id = 05 hex
<intunti>(n),               : component data length (n) in byte
<intunti>;                  : acceleration (+, - , 0 m/s*s)
```

FIG. 8J

```
<route_description_component(03)>:=Timetable type
<intunti>(id),              : identifier, id = 03 hex
<intunli>(n),               : component data length (n) in byte
<pti33>(timetable_type);    : Timetable type, TPEG table pti33
```

FIG. 8K

```
<route_description_component(04)>:=Location container
<intunti>(id),                     : identifier, id = 04 hex
<intunli>(n),                      : component data length (n) in byte
<pti15>(route_description_type);Route description type, TPEG table pti15
<tpeg_loc_container>;              : stop ID, bus stop identifier <loc03_36>
```

FIG. 8L

| | |
|---|---|
| <pti_component(A2)>:= | : Message report type |
| <intunti>(id), | : identifier, id = 0xA2 hex |
| <intunli>(n), | : component data length (n) in byte |
| <pti27>(message_report_type), | : TPEG table individual service information(pti27_4) |

FIG. 8M

| | |
|---|---|
| <pti_component(A3)>:= | : Additional information |
| <intunti>(id), | : identifier, id = 0xA3 hex |
| <intunli>(n), | : component data length (n) in byte |
| <pti30>(function_type), | : TPEG table pti30_1 : URL of traffic information provider |
| <loc41>(language_code), | : Language code |
| <short_string>; | : Additional information |

FIG. 9A

| | |
|---|---|
| <tpeg_loc_container>:= | : |
| <loc41> | : basic language table <loc41_65> Korean |
| m * <tpeg_loc_component()>; | : TPEG-Loc components |

FIG. 9B

| | |
|---|---|
| <tpeg_loc_component(00)>:= | : Location co-ordinates component |
| <intunti>(id), | : identifier, id = 00 hex |
| <intunli>(n), | : component data length (n) in byte |
| <loc01>, | : Location type, <loc01_3> segment |
| m * <co-ordinates_component()>; | : Location co-ordinates components |

FIG. 9C

| | |
|---|---|
| <co-ordinates_component(00)>:= | : Mode type list |
| <intunti>(id), | : identifier, id = 00 hex |
| <intunti>(n), | : component data length (n) in byte |
| m * <mode_component()>; | : Mode of transport components |

FIG. 9D

| | |
|---|---|
| <mode_component(00)>:= | : Mode of transport |
| <intunti>(id), | : identifier, id = 00 hex |
| <intunti>(n), | : component data length (n) in byte |
| <loc05>, | : Mode of transport, <loc05_6> bus |

FIG. 9E

| | |
|---|---|
| <co-ordinates_component(01)>:=WGS 84 | |
| <intunti>(id), | : identifier, id = 01 hex |
| <intunti>(n), | : component data length (n) in byte |
| <intsilo>(longitude), | : longitude (in 10 micro-degrees units) |
| <intsilo>(latitude), | : altitude (in 10 micro-degrees units) |
| m * <WGS84_component()>; | : WGS 84 components |

FIG. 9F

| | |
|---|---|
| <co-ordinates_component(02)>:=Descriptor | |
| <intunti>(id), | : identifier, id = 02 hex |
| <intunti>(n), | : component data length (n) in byte |
| <loc03>, | : Descriptor type, |
| <short_string>(name), | : Descriptor : carrying Node ID or bus stop ID |
| m * <descriptor_component()>; | Descriptor components |

| Stop | Route | scheduled arrival time | scheduled interval | predicted arrival time | current location of bus |
|---|---|---|---|---|---|
| 5-corners at industry complex | primary[B]504 | 2:02PM | 15 | 2:06PM | Guro industry complex |
| 5-corners at industry complex | branch[G]5528 | 2:01PM | 10 | 2:01PM | Gasan Elementary School |
| ⋮ | ⋮ | ⋮ | ⋮ | ⋮ | ⋮ |
| Kangnam station | intercity[R]9404 | 2:10PM | 20 | 2:08PM | Seohyeon station |
| ⋮ | ⋮ | ⋮ | ⋮ | ⋮ | ⋮ |

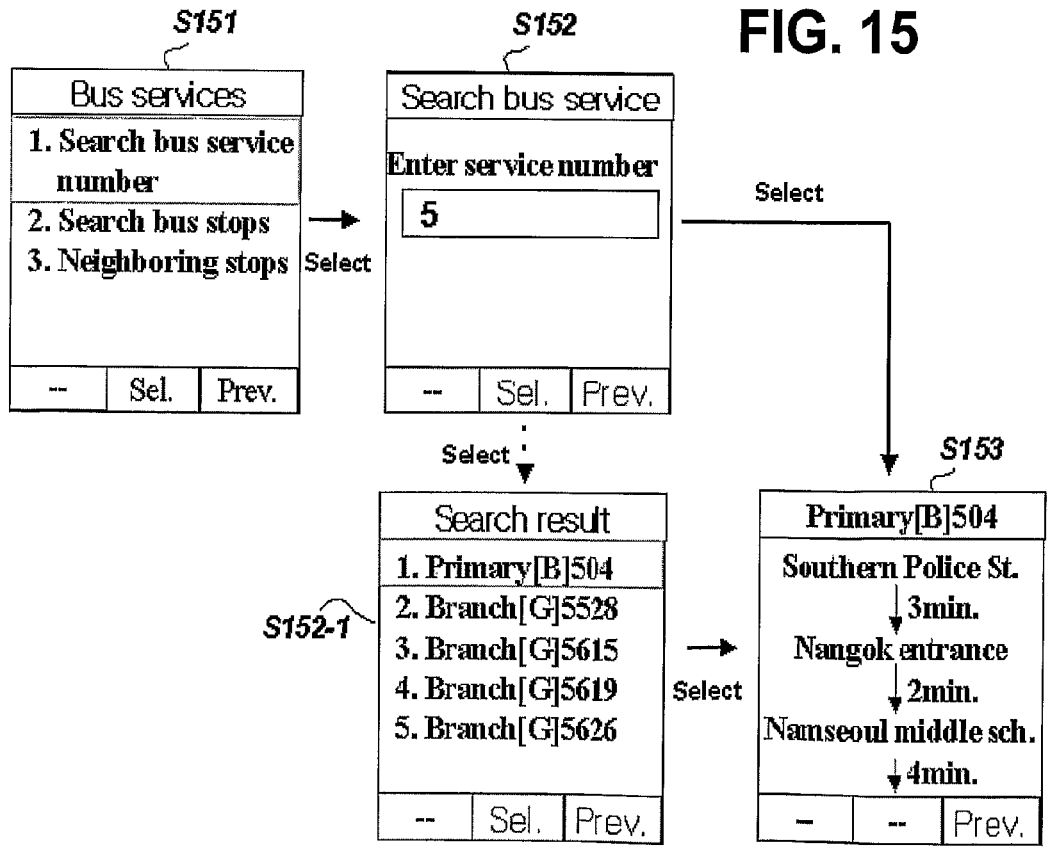

METHOD AND APPARATUS FOR PROVIDING PUBLIC TRAFFIC INFORMATION

1. TECHNICAL FIELD

The present invention relates to a method and apparatus for providing traffic information about public transportation means and utilizing the information.

2. BACKGROUND ART

Nowadays, with the development of digital signal processing and communication technologies, radio or television (TV) broadcast signals conveying content in a wireless fashion are gradually becoming available in the form of digital data. As broadcast signals are provided in digital form, various types of information can be provided along with radio or TV broadcast signals, and include news, stock information, weather information, traffic information, etc.

In the meantime, since roads are frequently congested with vehicles due to the increase in the number of vehicles in downtown areas and the increase in the number of vehicles used for vacations on holidays, environmental pollution is increased, therefore the utilization of public transportation is actively encouraged. Meanwhile, in order to induce citizens to voluntarily use public transportation, the use of the public transportation must be convenient and the time of the use of the public transportation must be predictable. For this purpose, for a public transportation means, such as buses, which are operated on roads along with general vehicles, operation information and information about variation in operation time depending on traffic conditions must be provided.

In the meantime, the provision of information about public transportation means presumes that terminals made by different manufacturers can detect broadcast digital traffic information, interpret it in the same manner, and provide it to a user, therefore a uniform standard is required.

3. DISCLOSURE OF INVENTION

Accordingly, the present invention has been made keeping in mind the above problems occurring in the prior art, and an object of the present invention is to provide a method and apparatus for providing public traffic information, which provide information about the operation of public transportation means, so that individuals can be aware of the time at which they can use the public transportation means with respect to any stop.

In order to accomplish the above object, the present invention provides a method of encoding traffic information, which creates information about a bus stop, creates identification information for respective bus routes passing through the bus route and information about arrival time, creates identification information indicating that the type of traffic information to be encoded is stop-based public traffic information, and constructs a message segment including the created information.

In order to accomplish the above object, the present invention provides another method of encoding traffic information, which creates information about a bus route, creates identification information for the route, identification information for respective stops belonging to the route and information about travel time, creates identification information indicating that the type of traffic information to be encoded is route-based public traffic information, and constructs a message segment including the created information.

In order to accomplish the above object, the present invention provides a method of decoding traffic information, which extracts a message segment carrying public traffic information from received signals, extracts information about a stop from the message segment, extracts identification information indicating that the type of traffic information carried on the message segment is stop-based public traffic information from the message segment, and decodes identification information for routes passing through a stop indicated by the extracted stop information and information about arrival time.

In order to accomplish the above object, the present invention provides another method of decoding traffic information, which extracts a message segment carrying public traffic information from received signals, extracts information about a route for transportation means, extracts identification information indicating that the type of traffic information carried on the message segment is route-based public traffic information from the message segment, and decodes identification information for stops belonging to a route indicated by the extracted route information and information about travel time.

In an embodiment of the present invention, message management information including a time point at which the public traffic information was created is further included in the message segment.

In an embodiment of the present invention, the information about the stop includes identification information that uniquely identifies the stop, and longitude and latitude information for the stop.

In another embodiment of the present invention, the information about the route includes identification information and longitude and latitude information for start and end points of the route.

In an embodiment of the present invention, the information about arrival time includes scheduled arrival time based on an operation schedule, operation intervals based on the operation schedule, and predicted arrival time based on actual traffic conditions.

In another embodiment of the present invention, the information about travel time includes scheduled travel time based on an operation schedule and predicted travel time based on actual traffic conditions.

In an embodiment of the present invention, the message segment includes information about a current location of transportation means on each of the routes that is nearest to the stop indicated by the information about the stop.

In another embodiment of the present invention, the message segment includes transition information about whether inter-stop traveling speed becomes high or low for each of the stops belonging to the route.

In an embodiment of the present invention, the message the message segment includes a message management container, a Public Traffic Information (PTI) event container and a Transport Protocol Exports Group (TPEG) location container that are defined by the TPEG.

In an embodiment of the present invention, the routes are bus routes.

In an embodiment of the present invention, only information about stops located within a predetermined distance from the current location of a traffic information receiver is selected from the decoded information, and is then stored in the traffic information receiver.

In an embodiment of the present invention, only information about stops located within a predetermined distance from the current location of a traffic information receiver is selected and showed to a user at the request of the user for public traffic information.

4. BRIEF DESCRIPTION OF DRAWINGS

The above and other objects, features and advantages of the present invention will be more clearly understood from the following detailed description taken in conjunction with the accompanying drawings, in which:

FIGS. 3A and 3B are diagrams illustrating the transmission format of a public traffic information message constructed according to an embodiment of the present invention, with emphases on a PTI event container and a TPEG location container, respectively;

FIGS. 4A to 4M are diagrams illustrating the syntaxes of principal elements that constitute the transmission format of FIG. 3A;

FIGS. 5A to 5F are diagrams illustrating the syntaxes of principal elements that constitute the transmission format of FIG. 3B;

FIGS. 7A and 7B are diagrams illustrating the transmission format of a public traffic information message constructed according to another embodiment of the present invention, with emphases on a PTI event container and a TPEG location container, respectively;

FIGS. 8A to 8M are diagrams illustrating the syntaxes of principal elements that constitute the transmission format of FIG. 7A;

FIGS. 9A to 9F are diagrams illustrating the syntaxes of principal elements that constitute the transmission format of FIG. 7B;

Figure 7A:
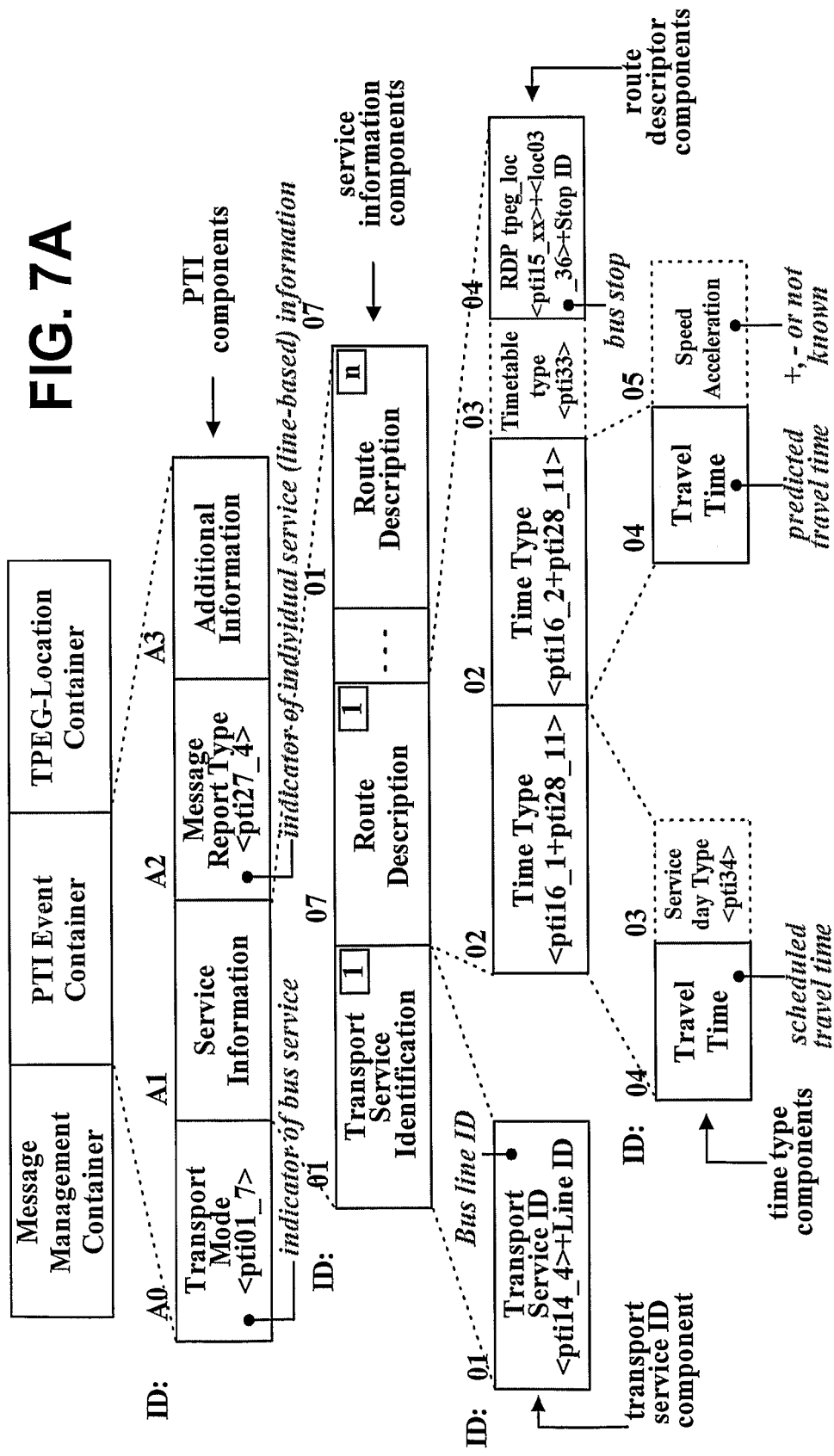
Figures 7B, 8A, 8B:
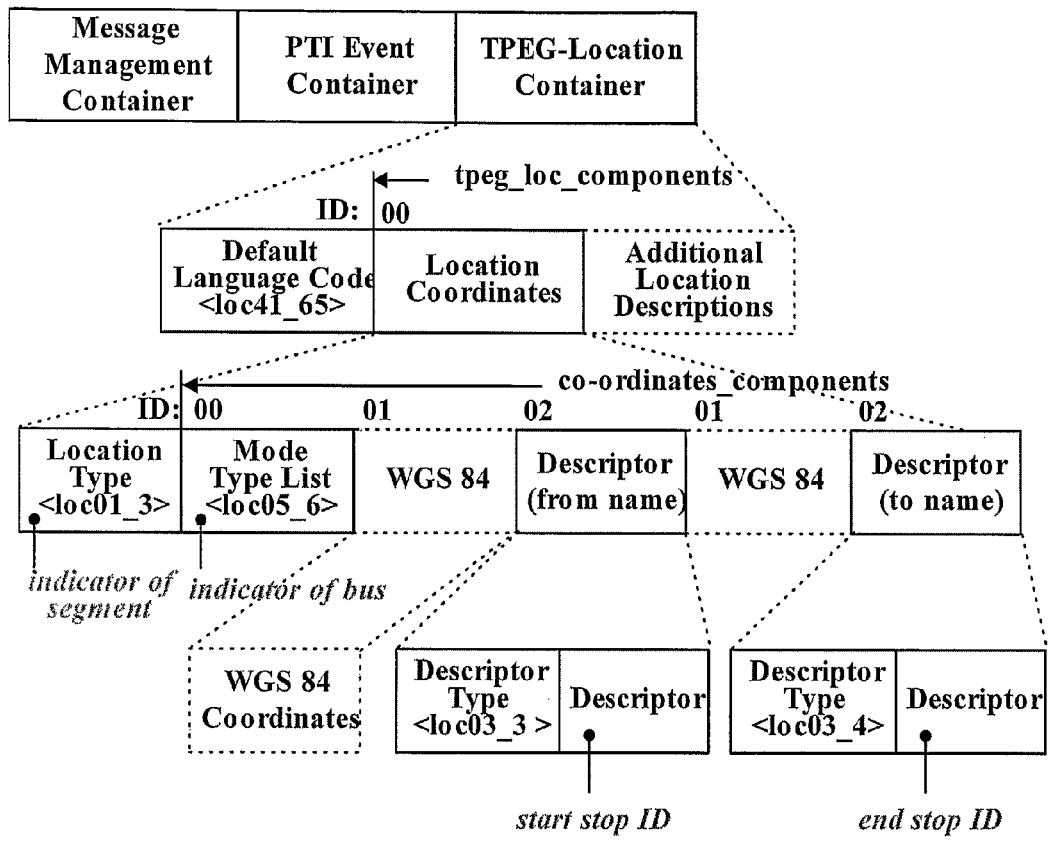
Figure 11:
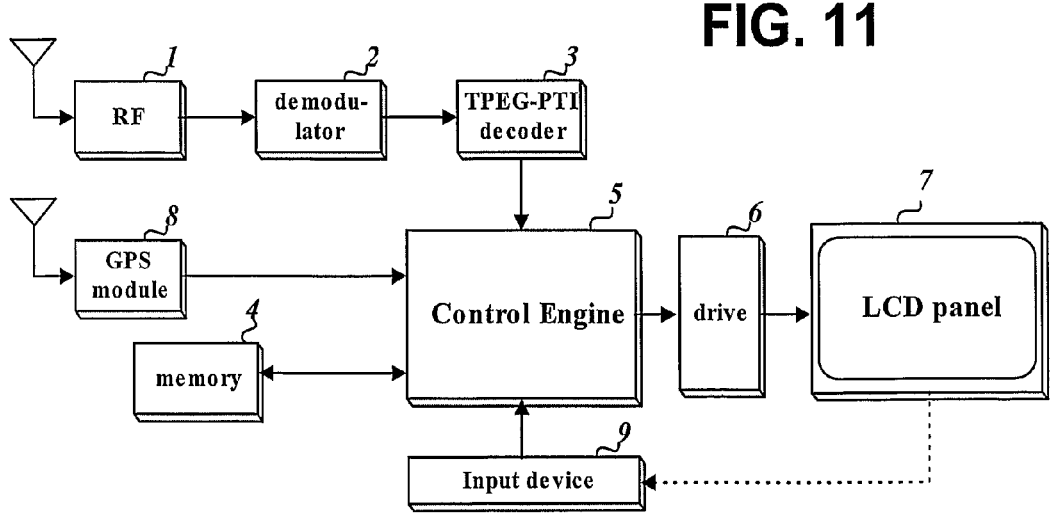
FIG. 11 is a block diagram of a terminal according to an embodiment of the present invention, which receives public traffic information from a traffic information providing server.

FIG. 14 is a diagram illustrating an example of a structure in which the terminal of FIG. 11 stores received public traffic information when the public traffic information is received according to the embodiments of FIGS. 7A and 7B; and FIG. 15 is a diagram illustrating an example of displaying information about input route according to a user's route input, in the embodiment in which public traffic information is stored as shown in FIG. 14.

5. MODES FOR CARRYING OUT THE INVENTION

Reference now should be made to the drawings, in which the same reference numerals are used throughout the different drawings to designate the same or similar components.

Figure 1:
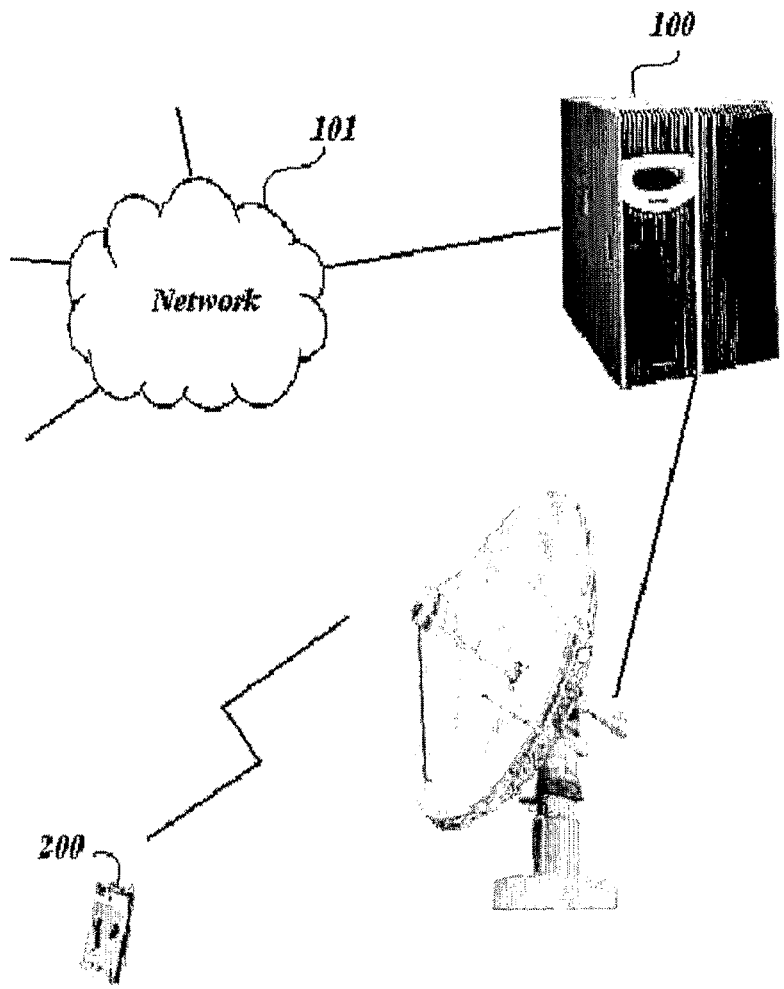
FIG. 1 is a schematic diagram illustrating a network for providing public traffic information according to the present invention.

FIG. 1 schematically illustrates a network that is used to provide traffic information about service states of public transportation means, such as buses (hereinafter also referred to as "(public) transportation information"). In the network of FIG. 1, for example, a transportation information providing server 100 on e.g., a broadcasting station compiles public traffic information collected via various paths, such as an operator's input or another server through the network 101, and wirelessly transmits the public transportation information so that public traffic information receiving terminals 200 (hereinafter referred to as "terminals") carried by general citizens can receive the public traffic information.

The public transportation means, such as buses, for which the public traffic information is provided, transmits information about the location thereof to a bus transportation information collection server (not shown) via a separate wireless network at regular intervals, and the bus transportation information collection server provides the collected public traffic information to the transportation information providing server 100 in real time. The bus transportation information collection server may be the transportation information providing server 100.

Figure 2:
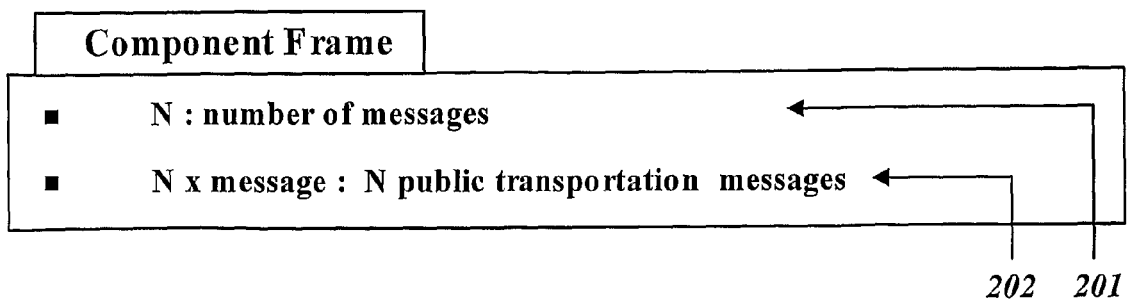
FIG. 2 is a diagram illustrating the syntax of part of a component frame including public traffic information.

The public traffic information wirelessly transmitted by the transportation information providing server 100 is provided in the form of a component frame. The component frame, as illustrated in FIG. 2, includes a field 201 indicating the number of messages included in the frame, and a sequence 202 of public traffic information messages equal in number to the number in the field 201 (hereinafter referred to as "Transport Protocol Experts Group (TPEG) Public Traffic Information (PTI) messages").

The transportation information providing server 100 may provide public traffic information on a stop basis or a route basis according to the present invention.

First, an embodiment of providing public traffic information on a stop basis is described in detail below.

Figure 3A:
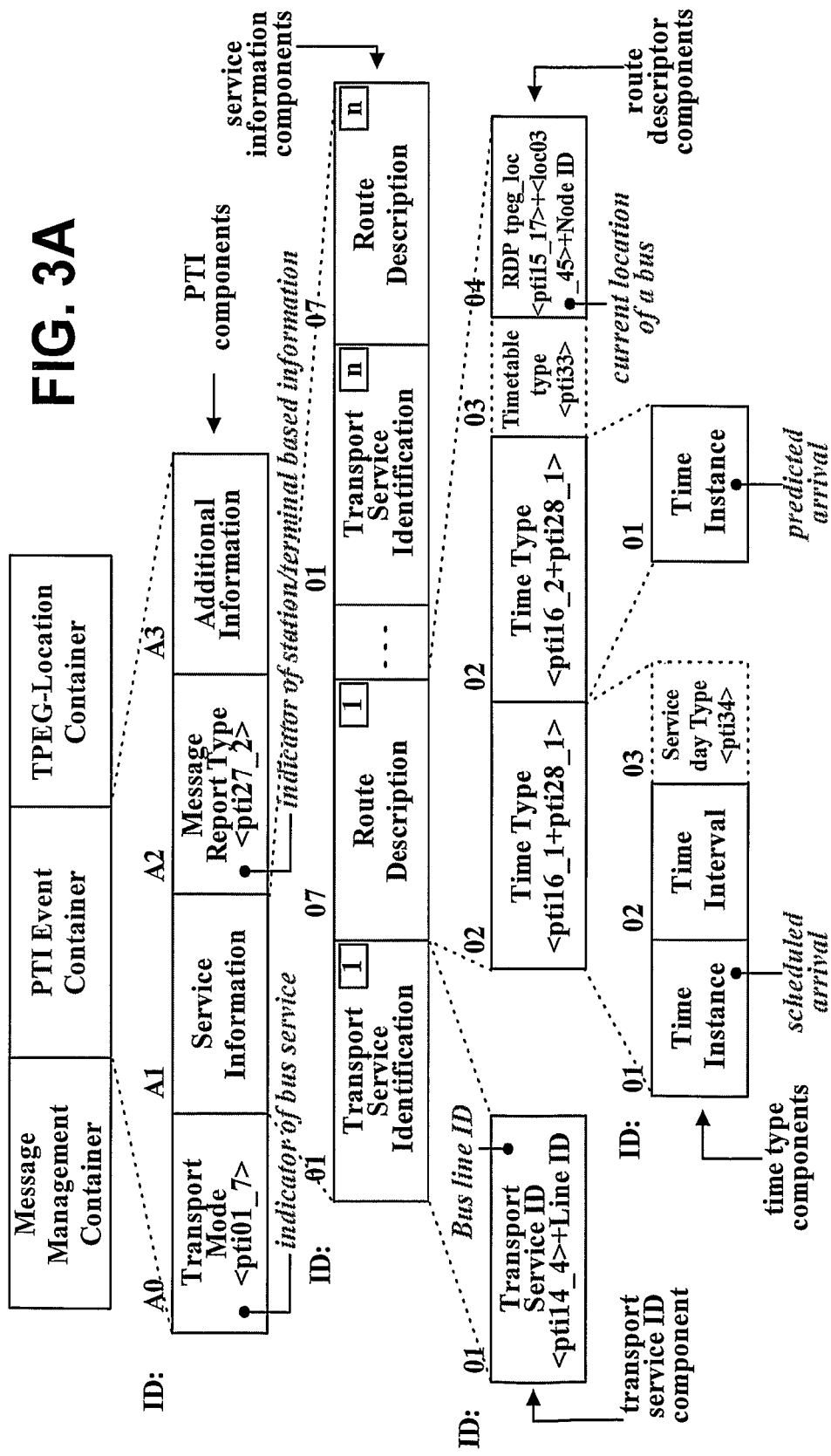
Figures 3B, 4A, 4B:
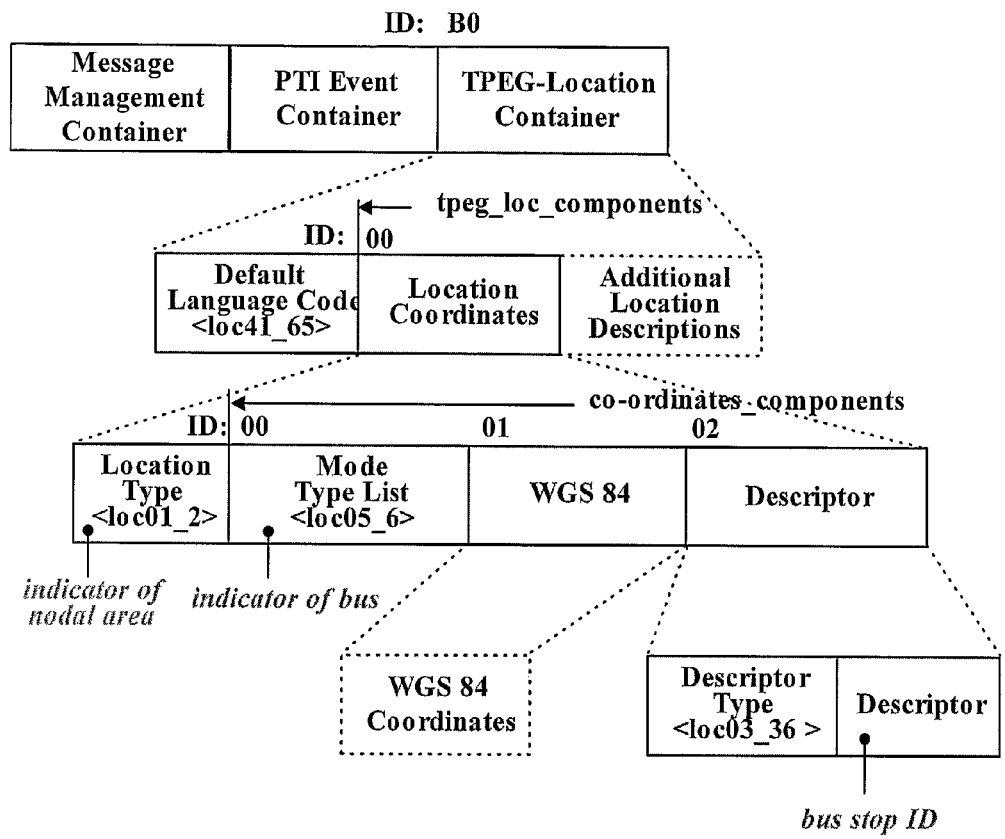

As illustrated in FIGS. 3A and 3B, the transportation information providing server 100 constructs one message segment of the sequence 202, that is, a TPEG PTI message, using a message management container that includes information about the date, the time, and the time point of occurrence of the message, a PTI event container, and a TPEG location container.

The PTI event container and the TPEG location container are formed of PTI components. A PTI component belongs to the PTI event container when the identifier of the PTI component is 0xA0, 0xA1, 0xA2 or 0xA3, whereas a PTI component belongs to the TPEG location container associated with public traffic information when the identifier of the PTI component is 0xB0.

The transportation information providing server 100, as illustrated in FIG. 3A, includes a transport mode field (PTI component having identifier 0xA0), a service information field (PTI component having identifier 0xA1), a message report type field (PTI component having identifier 0xA2) and an additional information field (PTI component having identifier 0xA3) in the structure of the PTI event container, and then transmits them. A value pti01_7, indicating service related to public transportation means, for example, buses, is recorded in the transport mode field, and a value pti27_2 indicating stop-based information is recorded in the message report type field. Information about the source of transportation information, for example, the name or Uniform Resource Locator (URL) of the source of public traffic information, may be recorded in the additional information field.

The notation of "ptiNN_ii" (where NN and ii respectively represent numbers), which was used to indicate specific values above, indicates ii value on the one of a plurality of pti tables (or hard-coded tables) previously stored in the terminal 200, which is called ptiNN. The value is a value that was agreed on by both the transportation information providing server 100 and the terminal 200. The above-described notation is applied to the following descriptions in the same manner. In the case of locNN_ii, there is a difference in that a target table is a loc table, and the same method of interpretation is applied to locNN_ii. The loc table has values agreed on by both the transportation information providing server 100 and the terminals 200. Although, in the embodiments of the present invention, the values of a table defined by the TPEG are used, the present invention is not limited to a specific standard, but the present invention may use a table that has values newly agreed on by both the source of the public traffic information and the terminals.

The transportation information providing server 100 records information about bus routes passing through a target stop (information about the target stop is recorded in the TPEG location container, which will be described later) in the service information field. The service information field, in which information about bus routes passing through a target stop is recorded, as illustrated in FIG. 3A, includes pairs respectively including a transport service identification field (service information component having identifier 0x01) and a route description field (service information component having identifier 0x07). The transport service identifier field contains a value pti14_4, indicating that the type of transport service is a bus route, and a transport service ID component having a 32-bit identifier related to the bus route. In each of the route description fields is recorded information about the time when a bus of a corresponding route (corresponding to an ID recorded in the transport service ID component) will arrive at a target stop and the location at which the bus is currently situated. The information about the arrival time of the bus includes the scheduled arrival time based on the operational schedule of the route and the predicted arrival time based on current traffic conditions. The scheduled arrival time and the predicted arrival time constitute respective time type fields (route description fields having identifier 0x02).

In each of the time type fields, values pti16_1 or pti16_2, indicating that the time instance recorded in the time type field is a scheduled value or a predicted value, and pti28_1, indicating that the time instance is arrival time, are recorded. In addition to the time instance field (time type component having identifier 0x01), the time type field in which the scheduled time is recorded includes information about the time intervals of operation (time type component having identifier 0x02), and may selectively include a service day type field (time type component having identifier 0x03) having information about running days, for example, value pti34_xx, designating one selected from among one or several days of a week, a weekend, and every day.

Furthermore, in the route description field, information about the current location of a bus that will arrive at a target bus stop (route descriptor component having identifier 0x04) is recorded. The current location information includes an ID, a value loc03_45 indicating that the ID is a node ID, and a value pti15_17 indicating that a location corresponding to the node ID is the current location of the bus. The term "node" refers to a small area, and may be an area including a plurality of bus stops, such as an airport or a train station. The time table type field (route component having identifier 0x03) may be selectively included in the route description field. In the time table type field, a value pti33_xx, designating one of spring, summer, fall, winter, and emergency, is recorded.

FIG. 3A illustrates the structure of the PTI event container, with an emphasis on the hierarchical relationships between respective elements that constitute a message. The syntaxes of the detailed structures of the respective elements are illustrated in FIGS. 4A to 4M. The transportation information providing server 100 constructs a message segment, including a PTI event container, in the transmission format shown in FIG. 3A so that the message segment can meet the syntaxes of the structures shown in FIGS. 4A to 4M, and transmits the message segment to the terminals 200.

In the meantime, the transportation information providing server 100, as illustrated in FIG. 3B, transmits information associated with a target stop in the form of a TPEG location container (PTI component having identifier 0xB0). In the TPEG location container, value loc41_xx (in the example of FIG. 3B, xx is set to 65, which designates "Korean") and one or more sub-location containers tpeg_loc_containers are recorded. In each of the sub-location containers, a location type information field (in the example of FIG. 3B, value loc01_2, indicating that the type of location information to be transmitted is a node, is recorded), and coordinate components are included. The coordinate components may include a mode type list field (coordinate component having identifier 0x00), a stop location information field (coordinate component having identifier 0x01) recorded in WGS84 format (latitude and longitude), and a descriptor field (coordinate component having identifier 0x02) associated with the bus stop. In the mode type list field, value loc05_6, indicating that a transportation mode is a bus, is recorded. In the descriptor field, an ID uniquely identifying the stop is recorded in a descriptor field, and a value loc03_36, indicating that an ID recorded in the descriptor field is associated with a bus stop, is recorded in a descriptor type field that is located in front of the descriptor field.

If the transportation information receiving terminals 200 are provided with longitude and latitude information about nodes and/or stops, a coordinate component, in which a longitude and latitude coordinate location is recorded, is not transmitted.

FIG. 3B illustrates the structure of the TPEG location container, with an emphasis on the hierarchical relationships between respective elements that constitute a message. The syntaxes of the detailed structures of the respective elements are illustrated in FIGS. 5A to 5F. The transportation information providing server 100 constructs a message segment, including a TPEG location container, in the transmission format shown in FIG. 3B, so that the message segment can meet the syntaxes illustrated in FIGS. 5A to 5F.

The transportation information providing server 100 constructs and transmits a message according to the above-described message construction method, with information about each stop being recorded in a TPEG location container and information about arrival times based on the running status of each bus route passing through each stop being recorded in a PTI event container.

Figure 6:
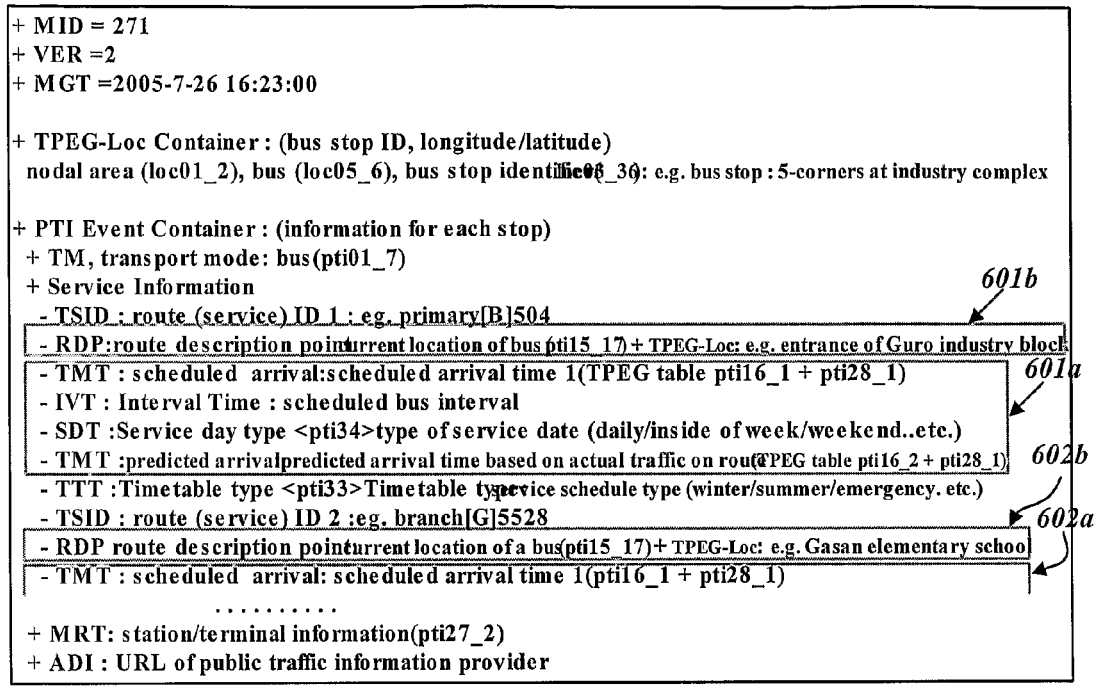
FIG. 6 is a diagram illustrating an example of public traffic information according to the embodiments of FIGS. 3A and 3B.

FIG. 6 illustrates an example of a message that is constructed according to the above-described method. The example of FIG. 6 indicates that, with respect to one of the stops (for example, "5-corners at industry complex"), the constructed message includes information 601a and 602a about the arrival time for bus routes (for example, "Primary Line [B] No. 504" and "Branch Line [G] No. 5528"), passing through the stop, and information 601*b* and 602*b* about the current locations of subsequent buses that will arrive at a target stop (for example, "5-corners at industry complex").

FIG. 6 illustrates a very simple example that is presented for ease of understanding. When the number of stops located in the area of a public traffic information providing service is N, the transportation information providing server 100 constructs a number of service information components equal to a number 2*SN (where 2*SN is twice a number $$SN = \sum_{i=1}^{N} f(i)$$

which is obtained by adding the numbers f(i) of bus routes passing through the respective stops i), and transmits the service information components.

A method of providing route-based public traffic information according to another embodiment of the present invention is described in detail below.

The transportation information providing server 100 constructs one message segment of the sequence 202 of FIG. 2, that is, a TPEG PTI message, using a message management container that includes information about the date, the time and the time point of occurrence of the message, a PTI event container and a TPEG location container, as illustrated in FIGS. 7A and 7B.

In the present embodiment, the PTI event container and the TPEG location container are all formed of PTI components, as in the embodiment. A PTI component belongs to the PTI event container when the identifier of the PTI component is 0xA0, 0xA1, 0xA2, or 0xA3, whereas a PTI component belongs to the TPEG location container associated with public traffic information when the identifier of the PTI component is 0xB0.

The transportation information providing server 100, as illustrated in FIG. 7A, transmits a transport mode field (PTI component having identifier 0xA0), a service information field (PTI component having identifier 0xA1), a message report type field (PTI component having identifier 0xA2) and an additional information field (PTI component having identifier 0xA3) while including them in the structure of the PTI event container. Value pti01__7, indicating a service associated with public transportation means, for example, buses, is recorded in the transport mode field, and value pti27__2, indicating route-based information, is recorded in the message report type field. Meanwhile, information about the source of transportation information, for example, the name or URL of the source of public traffic information, may be recorded in the additional information field.

The transportation information providing server 100 records information about stops belonging to a target route in the service information field (information about the route is recorded in the TPEG location container, and will be described later). The service information field, carrying the information about stops belonging to a route, as illustrated in FIG. 7A, includes a transport service identification field (service information component having identifier 0x01) and a number of route description fields (service information components having identifier 0x07) equal to the number of stops. The transport service identifier field includes a value pti14__4 indicating that the type of transport service is a bus route, and a transport service ID component, having a 32-bit identifier associated with the route. In each of the route description fields, the time (travel time) that is required by a bus, running along a target route, to arrive at a corresponding stop (a stop designated by an ID that is recorded in a following route descriptor component having identifier 0x04) from a previous stop, and information about speed transition are recorded. The information about travel time between neighboring stops includes the scheduled travel time between stops based on the running schedule of the route and the predicted travel time between stops based on current traffic conditions. The scheduled travel time and the predicted travel time constitute respective time type fields (route descriptor components having identifier 0x02). The travel time is described in minutes. The transportation information providing server 100 may transmit value 0 for the travel time associated with a stop corresponding to the start point of each route, or may not provide information about the travel time for the start point by not assigning a route descriptor component to the start point when providing information about the respective stops of each route via PTI event containers.

In each of the time type fields, pti16__1 or pti16__2, indicating that recorded travel time information is a scheduled value or a predicted value, and value pti28__11, indicating that recorded information is travel time, are recorded. In addition to the travel time field (time type component having identifier 0x01), the time type field in which the scheduled travel time is recorded may selectively include a service day type field (time type component having identifier 0x03) having information about a service day type, for example, value pti34_xx designating one of a day or days of a week, a weekend, and every day. In addition to the travel time field (time type component having identifier 0x01), the time type field in which the predicted travel time is recorded may selectively include a speed acceleration field (time type component having identifier 0x05) indicating whether running speed increases or decreases in an interval between the previous stop and the corresponding stop.

Furthermore, in the route description field, information (route descriptor component having identifier 0x04) about a stop belonging to a target route is recorded. This stop information includes an ID, a value loc03__36, indicating that the ID is a stop ID, and information about the type of stop corresponding to the ID, for example, a value pti15_xx designating one of a start point, an end point, an intermediate stop, and emergency parking. A time table type field (route descriptor component having identifier 0x03) may be selectively included in the route description field. In the time table type field, running table information is recorded, with value pti33_xx designating one of spring, summer, fall, winter, and emergency.

FIG. 7A illustrates the structure of the PTI event container, with an emphasis on the hierarchical relationships between respective elements that constitute a message. The syntaxes of the detailed structures of the respective elements are illustrated in FIGS. 8A to 8M. The transportation information providing server 100 constructs a message segment, including a PTI event container, in the transmission format shown in FIG. 7A so that the message segment can meet the syntaxes of the structures shown in FIGS. 8A to 8M, and transmits the message segment to the terminals 200.

In the meantime, the transportation information providing server 100, as illustrated in FIG. 7B, transmits information associated with a target route in the form of a TPEG location container (PTI component having identifier 0xB0). In the TPEG location container, value loc41_xx (in the example of FIG. 7B, xx is set to 65, which designates "Korean") and one or more sub-location containers tpeg_loc_containers are recorded. In each of the sub-location containers, a location type information field (in the example of FIG. 7B, value loc01_3, indicating that the type of location information to be transmitted is a route, is recorded), and coordinate components are included. The coordinate components may include a mode type list field (coordinate component having identifier 0x00), route start and end point location information fields (coordinate components having identifier 0x01) represented by longitude and latitude, and route start and end point descriptor fields (coordinate components having identifier 0x02). In the mode type list field, value loc05_6, indicating that a transportation mode is a bus, is recorded. In each of the descriptor fields, a name or an ID uniquely identifying the start or end point of the target route is recorded in a descriptor field, and value loc03_3 or loc03_4, indicating that the name or ID recorded in the descriptor field is associated with the start or end point of the route, is recorded in a descriptor type field located in front of the descriptor field.

If the transportation information receiving terminals 200 are provided with longitude and latitude information about nodes and/or stops, coordinate components, in which longitude and latitude coordinate locations are recorded, are not transmitted.

FIG. 7B illustrates the structure of the TPEG location container, with an emphasis on the hierarchical relationships between respective elements that constitute a message. The syntaxes of the detailed structures of the respective elements are illustrated in FIGS. 9A to 9F. The transportation information providing server 100 constructs a message segment, including a TPEG location container, in the transmission format shown in FIG. 3B, so that the message segment can meet the syntaxes illustrated in FIGS. 9A to 9F.

The transportation information providing server 100 constructs and transmits a message according to the above-described message construction method, with information about each bus route being recorded in a TPEG location container and information about arrival time based on the running status of each bus route with respect to respective associated stops being recorded in a PTI event container.

Figure 10:
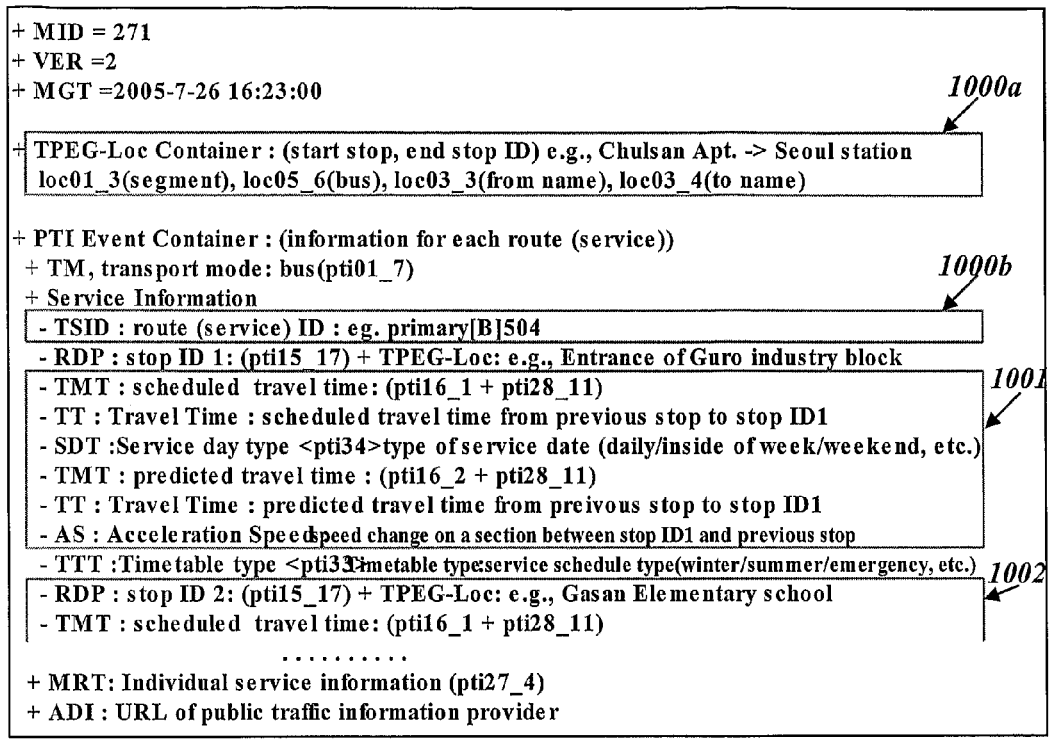
FIG. 10 is a diagram illustrating an example of public traffic information according to the embodiments of FIGS. 7A and 7B.

FIG. 10 illustrates an example of a message that is constructed according to the above-described method. The example of FIG. 10 indicates that the constructed message includes information about travel time taken from a previous stop to arrival and interval speed transition 1001 and 1002 that is associated with a first bus stop (for example, "Entrance to Guro Industry Complex") and a second bus stop (for example, "Gasan Elementary School") that belong to one of the routes (for example, a route 1000*a* extends from start point "Cheolsan Apartments" to end point "Seoul Station", and has route ID "Primary Line [B] No. 504 1000*b*).

FIG. 10 illustrates a very simple example, presented for ease of understanding. When the number of routes located in the area of a public traffic information providing service is M, the transportation information providing server 100 constructs a number of service information components equal to a number M+SN (where M+SN is larger by the number of routes M than a number $$SN = \sum_{i=1}^{M} g(i)$$

which is obtained by adding the numbers g(i) of stops belonging to respective M routes i), and transmits the service information components. In this case, the M service information components are assigned to the transmission of route information.

The terminal 200 of FIG. 1, which receives public traffic information transmitted according to the above-described embodiments, may store stop ID-based basic information and route ID-based basic information in addition to the above-described pti tables and loc tables. Each piece of stop ID-based basic information may include a stop ID, a stop type, stop name and length information, longitude and latitude coordinates, and the number and IDs of routes passing through the stop. Each piece of route ID-based basic information may include a route ID, a route name, a route type, the IDs of start and end points, the number of stops, first bus arrival time and last bus arrival time for each stop, and route shape information. The route shape information includes shape points that can represent the shape of a road when the road is displayed on a Video Graphics Array (VGA) or Quarter VGA (QVGA) display, and the IDs and longitude and latitude coordinates of the shape points. Additionally, the terminal 200 of FIG. 1 can store information about node IDs as basic information.

When the terminal 200 is not provided with the basic information, the transportation information providing server 100 may construct basic information that is not provided via the above-described real-time public traffic information providing service, for example, the first bus arrival time and last bus arrival time for each stop, or route shape information, and provide it to the terminal 200.

FIG. 11 illustrates the detailed construction of the transportation information receiving terminal 200 of FIG. 1 according to an embodiment of the present invention, which receives public traffic information from the transportation information providing server 100. The terminal 200 of FIG. 11 includes a tuner 1 for tuning to a signal band through which public traffic information is provided and outputting modulated public traffic information signals, a demodulator 2 for demodulating the modulated public traffic information signals and outputting public traffic information signals, a TPEG-PTI decoder 3 for acquiring various types of public traffic information by decoding the demodulated public traffic information signals, a Global Positioning System (GPS) module 8 for receiving satellite signals from a plurality of low earth orbit-satellites and finding a current location (longitude, latitude, and altitude), memory 4 for storing decoded public traffic information, an input unit 9 for receiving input from a user, a control engine 5 for controlling screen output based on the input of the user, the current location and the acquired public traffic information, a Liquid Crystal Display (LCD) panel 7 for performing image display, and an LCD drive 6 for applying drive signals based on text or graphics to be displayed on the LCD panel 7. The input unit 9 may be a touch screen provided on the LCD panel 7. The terminal 200 may have non-volatile memory in which an electronic map is stored, in addition to the memory 4.

The tuner 1 tunes to signals transmitted from the transportation information providing server 100, and the demodulator 2 demodulates the tuned signals using a predetermined method and outputs the demodulated signals. Then, the TPEG-PTI decoder 3 extracts a public traffic information message, which is constructed as illustrated in FIGS. 2, 3A and 3B, 4A to 4M, and 5A to 5F, or as illustrated in FIGS. 2, 7A and 7B, 8A to 8M, and 9A to 9F, from input demodulated signals, temporarily stores the public traffic information message, interprets the temporarily stored TPEG PTI messages, and transmits information and/or control data suitable for the content of the message to the control engine 5. The TPEG-PTI decoder 3 examines whether the method of encoding public traffic information is a stop-based encoding or route-based encoding method based on an identification value, that is, pti27_2 or pti27_4, recorded in the message report type field of the extracted public transportation message, and interprets the structure of the public traffic information recorded in the service information field. For example, it is examined whether the information recorded in the service information field is composed of information about route and arrival time pairs or information about routes and travel times for stops belonging to the routes.

Figures 12, 13:
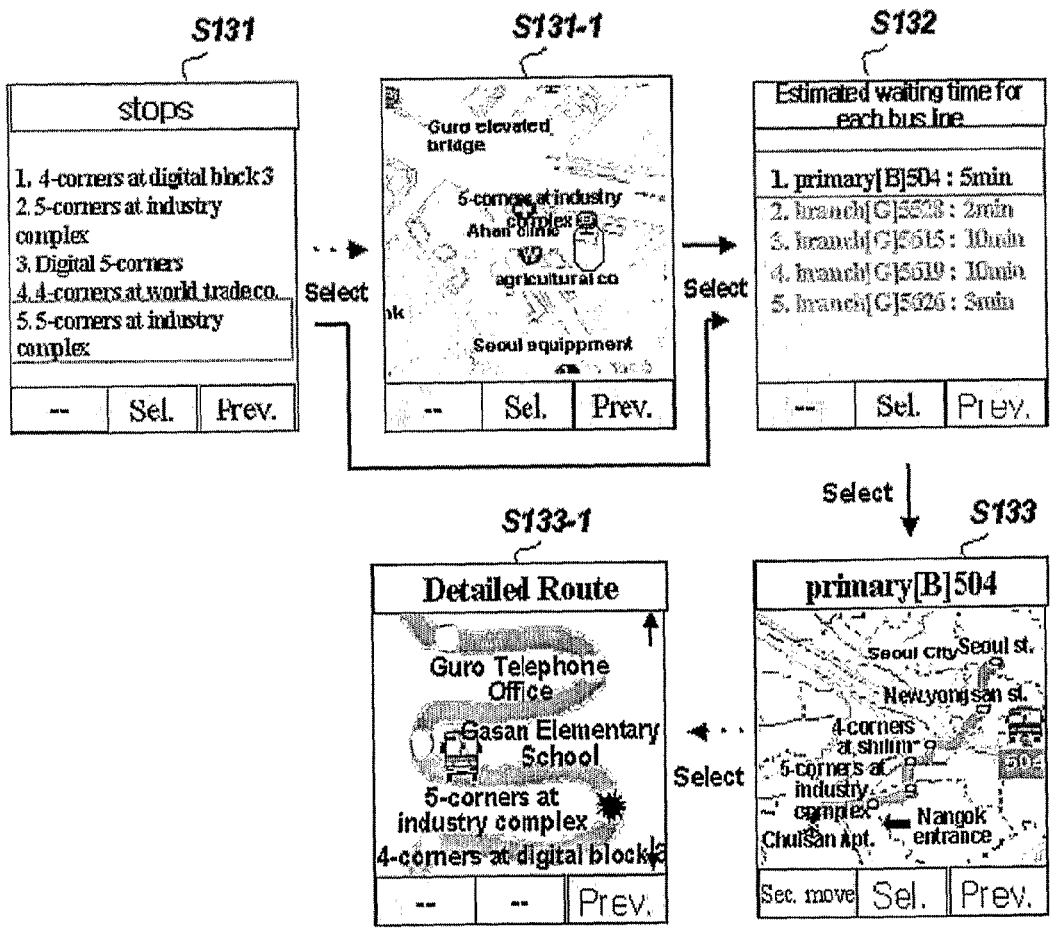
FIG. 12 is a diagram illustrating an example of a structure in which the terminal of FIG. 11 stores received public traffic information when the public traffic information is received according to the embodiments of FIGS. 3A and 3B.
FIG. 13 is a diagram illustrating an example of displaying information in the sequence of stop and route lists at the request of a user for public traffic information, in the embodiment in which the public traffic information is stored as shown in FIG. 12.

In an embodiment in which the transmission shown in FIGS. 3A and 3B is performed (in the case where a value recorded in the message report type field is pti27_2), the control engine 5 stores data, which is received from the TPEG-PTI decoder 3, in the memory 4 in the structure of FIG. 12. FIG. 12 simply shows an example of a data storage structure. Accordingly, if information elements other than the information elements of the illustrated data storage structure of FIG. 12 are provided from the transportation information providing server 100, the other elements are structured and stored in the memory 4. Although, in the example of FIG. 12, names are used as identification information for respective stops or routes, this is for ease of understanding. In practice, codes assigned to respective stops or routes are used and stored. When the codes are presented to users, the names of stops or routes associated with corresponding codes are read from a stop or route list, which is basic information (read from separate memory or received from the transportation information providing server 100), and are used.

The terminal 200 stores longitude and latitude information for respective stops and shape information for respective routes in a separate information table. The information table may be stored in the memory 4 in the case where it is constructed using information provided from the transportation information providing server 100, and may be stored in separate memory in the case where it is constructed at the time of manufacturing a terminal.

For the public traffic information stored in the structure of FIG. 12, corresponding information is updated whenever new information is received from the transportation information providing server 100.

Alternatively, the control engine 5 does not store all data that is received from the TPEG-PTI decoder 3 in the memory 4, but may select and store only data about stops adjacent to a current location, for example, stops located within a radius of 1 km, that can be found by the GPS module 8. The reason for this is to efficiently use the limited-capacity memory by storing only the public traffic information that is most likely to be needed by the user of the terminal 200.

If a user requests public traffic information via the input unit 9 while the received public traffic information is stored as described above, the control engine 5 searches the memory 4 for stops the longitude and latitude-based locations of which are within a predetermined distance, for example, 1 km, from a current location detected by the GPS module 8, and displays the stops on the LCD panel 7 in list form, as illustrated in FIG. 13, at step S131. In this case, the control engine 5 applies an appropriate drive signal to the LCD drive 6 so as to display a stop list.

When a user selects a stop from the list displayed on a screen via the input unit 9, the control engine 5 acquires information about the predicted arrival time (or scheduled arrival time) for the stop and each route that is stored in the memory 4 as shown in FIG. 12, and displays the information, along with identification information for the route, on a screen at step S132. By manipulating another selection key or a movement key via the input unit 9, different information, for example; the current locations of subsequent buses, stored for the stop and each route may be displayed.

When the stop is selected in the state of the stop being displayed at step S131 in the case where the terminal 200 has non-volatile memory (hereinafter referred to as a 'storage means') containing an electronic map, the necessary portion of the electronic map (region displayable on the LCD panel 7) surrounding the stop may be read from the storage means, and may be displayed on the LCD panel 7 via the drive 6 at step S131-1. A specific graphic symbol is indicated at a current location, and information about a description of the selected stop and a specific graphic symbol are indicated at the location of the selected stop. When a confirmation key is pressed in the state of the portion of the electronic map surrounding the selected stop being displayed, information about routes passing through the stop is displayed.

When the user selects a route in the state of a route list being displayed on a screen, the control engine 5 reads shape information for the route and information about stops belonging to the route from the memory 4 and/or separate memory and displays it on a screen at step S133. Through this display, the user can determine whether the route enables the user to reach a desired destination. In this case, if the storage means is provided, the control engine 5 indicates information about the shape of the route on the electronic map. When the user inputs 'detail' or 'select' in the above state, the control engine 5 enlarges the portion of a route map surrounding the selected stop based on the displayed shape information and displays the enlarged portion on the screen at step S133-1. When the portion of the route map is displayed in detail, information about the current location of a subsequent bus (stop ID or node ID) is read from the information about the selected route passing through the selected stop that is stored in the memory 4, and a specific icon, for example, a bus icon, is displayed on the screen at the current location on the screen, so that the user can visually become aware of the location of the bus.

In an embodiment in which public traffic information is transmitted from the transportation information providing server 100 as illustrated in FIGS. 7A and 7B (in the case where a value recorded in the message report type field is pti27_4), the control engine 5 stores data, which is received from the TPEG-PTI decoder 3, in the memory 4 in the structure of FIG. 14. FIG. 14 illustrates only an example of a data storage structure. Accordingly, if information elements other than the information elements of the illustrated data storage structure of FIG. 14 are provided from the transportation information providing server 100, the other elements are structured and stored in the memory 4. In the 'speed transition field' of FIG. 14, a negative ('−') value, for example, −1, is recorded in the case where the speed of a corresponding interval is low, a positive ('+') value, for example, +1, is recorded in the case where the speed is high, and a value of 0 is recorded in the case where there is no variation in speed or variation in speed cannot be determined. The above-described value is a value that is provided by the transportation information providing server 100. In the case where variation in speed cannot be found, a value different from a value for the case where variation in speed cannot be found, for example, a value of 2, may be assigned and used.

Like the above-described embodiment, in the present embodiment, the terminal 200 has longitude and latitude information for respective stops and shape information for respective routes in separate information tables. The information tables may be stored in the memory 4 in the case where they are constructed using information provided from the transportation information providing server 100, or may be embedded in separate memory in the case where they are constructed at the time of manufacturing the terminal 200.

For the public traffic information stored in the structure of FIG. 14, corresponding information is updated whenever new information is received from the transportation information providing server 100.

Alternatively, the control engine 5 does not store all data that is received from the TPEG-PTI decoder 3, in the memory 4, but may select and store only data about stops adjacent to a current location, for example, stops located within a radius of 1 km, that can be found by the GPS module 8.

When the user requests public traffic information via the input unit 9 in the state of the received public traffic information being stored as described above, a public traffic information-related menu, the items of which can be selected by the user, is displayed on the LCD panel 7, as illustrated in FIG. 15, at step S151. When a route number search item is selected from the displayed menu, an input window is provided. When a route number is input via the input window at step S152, the control engine 5 searches the memory 4, acquires information about the predicted (or scheduled) travel time for each stop, which is stored as illustrated in FIG. 14, for the corresponding route number, and displays the information along with a stop identification name on the screen at step S153. In this case, as illustrated in FIG. 14, the longitude and latitude of respective stops may be displayed for the portion of the route including stops located within a predetermined distance, for example, 1 km, from a current location, that are detected by the GPS module 8. Alternatively, in the case where a storage means containing an electronic map is provided, the shape of a selected route is indicated on the electronic map. In this state, the user may obtain information about the stops of another non-indicated interval using the movement key of the input unit 9.

If the user inputs part of a route number via the input window, a plurality of route numbers may match the input number. In this case, the control engine 5 searches for all route numbers having the matching number from the public traffic information stored as illustrated in FIG. 14, and enumerates the found route numbers along with identification information for respective routes on the screen at step S152-1. When a route is selected from the enumerated routes, predicted (or scheduled) interval travel time for each stop belonging to the route is displayed on the screen, as described above, at step S153.

In order to provide for the case where the 'route number search' is not selected and a stop-related search is selected from the public traffic information-related menu at step S151, the control engine 5 searches for stop-related fields 141 from the public traffic information stored in the structure of FIG. 14, and separately constructs tables for routes passing through respective stops. For example, if a stop A is detected in all three routes L1, L2, and L3, a table that maps the three routes L1, L2, and L3 to the stop A is constructed. This table is used to rapidly present routes passing through a stop to a user when the stop is found through a stop search.

Meanwhile, in the above-described embodiments, the terminal of FIG. 11 may include a voice output means. In this case, predicted arrival time (or scheduled time) may be output in voice form when a user selects a stop and one of the routes passing through the stop, or the predicted travel time may be output in voice form when a user selects a route and a stop belonging to the route. Other information may also be output in voice form. The voice output means is previously provided with data that is necessary for voice synthesis.

At least one of the above-described embodiments of the present invention allows citizens using public transportation to predict waiting time for an available public transportation means, so that they can perform some other business, for example, purchase a product or have coffee at a café, without waiting for the transportation means at a stop. Furthermore, by providing information about the available time for the public transportation means, more people can use the public transportation means, so that the number of owner-driven vehicles on roads can be reduced, therefore economic and social costs incurred upon the construction of roads and the prevention of environmental pollution can be decreased.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

The invention claimed is:

1. A method of processing traffic information at a server including an encoder and a transmitter, comprising:
    encoding, at the encoder, the traffic information including a Transport Protocol Experts Group (TPEG) message segment and information corresponding to a number of the message segment; and
    transmitting, at the transmitter, the encoded traffic information,
    wherein the message segment includes a message management container, an event container, and a location container,
    wherein the message management container includes a version of the message segment and a generation time of the message segment,
    wherein the event container includes information about a stop, information for respective routes passing through the stop, and information about a service day type, and
    wherein the location container includes location information of the stop,
    wherein the event container further includes information about travel time between the stops,
    wherein the information about travel time comprises:
        a first travel time based on an operation schedule;
        a second travel time based on actual traffic conditions;
        first identification information corresponding to the first travel time; and
        second identification information corresponding to the second travel time.

2. The method as set forth in claim 1, wherein message management container further includes a time point at which the traffic information was created.

3. The method as set forth in claim 1, wherein the information about the stop comprises identification information that uniquely identifies the stop.

4. The method as set forth in claim 3, wherein the information about the stop further comprises longitude and latitude information for the stop.

5. The method as set forth in claim 1, wherein the information for the respective routes comprises identification information for the respective routes.

6. The method as set forth in claim 1,
    wherein the event container further includes first language information, and additional information,
    wherein the location container further includes second language information.

7. The method as set forth in claim 1, wherein the information about arrival time further comprises operation intervals based on the operation schedule.

8. The method as set forth in claim 1, wherein the traffic information further includes information about a current location of transportation means on each of the routes that is nearest to the stop indicated by the information about the stop.

9. The method as set forth in claim 8, wherein the information about the current location is identification information that uniquely identifies a small region.

10. The method as set forth in claim 1, wherein the traffic information further includes identification information that indicates that the traffic information to be encoded is stop-based traffic information.

11. The method as set forth in claim 1, wherein the routes are bus routes.

12. A method of processing traffic information at a terminal including a receiver and a decoder, comprising:
receiving, at the receiver, the traffic information including a Transport Protocol Experts Group (TPEG) message segment and information corresponding to a number of the message segment; and
decoding, at the decoder, the received traffic information,
wherein the message segment includes a message management container, an event container, and a location container,
wherein the message management container includes a version of the message segment and a generation time of the message segment,
wherein the event container includes information about a stop, information for respective routes passing through the stop, and information about a service day type, and
wherein the location container includes location information of the stop,
wherein the event container further includes information about travel time between the stops,
wherein the information about travel time comprises:
a first travel time based on an operation schedule;
a second travel time based on actual traffic conditions;
first identification information corresponding to the first travel time; and
second identification information corresponding to the second travel time.

13. The method as set forth in claim 12, wherein the message management container further includes a time point at which the traffic information was created.

14. The method as set forth in claim 12, wherein the information about the comprises identification information that uniquely identifies the stop.

15. The method as set forth in claim 14, wherein the information about the stop further comprises longitude and latitude information for the stop.

16. The method as set forth in claim 12, wherein the information for the respective routes comprises identification information for the respective routes.

17. The method as set forth in claim 12,
wherein the event container further includes a first language information, and additional information,
wherein the location container further includes a second language information.

18. The method as set forth in claim 12, wherein the information about arrival time further comprises operation intervals based on the operation schedule.

19. The method as set forth in claim 12, wherein the traffic information further includes information about a current location of transportation means on each of the routes.

20. The method as set forth in claim 12, wherein the information about the current location is identification information that uniquely identifies a small region.

21. The method as set forth in claim 12, wherein the routes are bus routes.

22. An apparatus for processing traffic information, comprising:

a demodulator for demodulating received signals and outputting a message sequence carrying public traffic information;
a decoder for extracting stop information from each message segment of the message sequence, extracting traffic information about respective routes passing through a stop indicated by the extracted stop information, and extracting information about a service day type; and
a control unit for causing the extracted information to be stored in storage means, and causing part of the stored information to be output via an output unit according to conditions,
wherein the message segment is a Transport Protocol Experts Group (TPEG) message segment,
wherein the message segment includes a message management container, an event container, and a location container,
wherein the message management container includes a version of the message segment and a generation time of the message segment,
wherein the stop information, information for respective routes passing through the stop, and information about the service day type are included in the event container,
wherein the location container includes location information of the stop, and
wherein the traffic information further includes information corresponding to a number of the message segment,
wherein the event container further includes information about travel time between the stops,
wherein the information about travel time comprises:
a first travel time based on an operation schedule;
a second travel time based on actual traffic conditions;
first identification information corresponding to the first travel time; and
second identification information corresponding to the second travel time.

23. The apparatus as set forth in claim 22, wherein the message management container further includes a time point at which the public traffic information was created.

24. The apparatus as set forth in claim 22, wherein the stop information comprises identification information that uniquely identifies the stop.

25. The apparatus as set forth in claim 22, wherein the traffic information further includes identification indicating that the traffic information carried on the message segment is stop-based public traffic information.

26. The apparatus as set forth in claim 22, wherein the traffic information about each of the routes comprises identification information for the route.

27. The apparatus as set forth in claim 22,
wherein the event container further includes a first language information, and additional information,
wherein the location container further includes a second language information.

28. The apparatus as set forth in claim 22, wherein the traffic information further includes information about a current location of transportation means on each of the routes from the message segment.

29. The apparatus as set forth in claim 22, wherein the output unit visually or aurally presents the part of the stored information.

30. The apparatus as set forth in claim 22, wherein the control unit causes information about stops to be read from the storage means and to be output in a list via the output means, and causes traffic information for respective routes passing through a stop selected from the output list to be read from the storage means and to be output in a route list via the output unit, at a user's request for public traffic information.

31. The apparatus as set forth in claim 30, further comprising a location detector for detecting information about a current location;
   wherein the control unit causes traffic information about stops adjacent to the detected current location to be selectively read from the storage means and to be output in a list via the output unit at a user's request for public traffic information.

32. The apparatus as set forth in claim 30, wherein the control unit causes a shape of a selected route and names of stops belonging to the selected route to be indicated on an electronic map by the output unit when the route is selected from the output route list.

33. The apparatus as set forth in claim 32, wherein the control unit causes transportation means on the selected route, which is nearest to the selected stop, to be indicated on the output shape of the route.

34. The apparatus as set forth in claim 22, further comprising a location detector for detecting information about a current location;
   wherein the control unit causes only traffic information about stops adjacent to the detected current location, which belongs to the extracted information, to be stored in the storage means.

35. The method as set forth in claim 1, wherein the information about the service day type indicates a service type for a day.

36. The method as set forth in claim 1, wherein the information about the service day type indicates running days for a transportation route.

37. The method as set forth in claim 1, wherein the information about the service day type designates a day selected from among one or several days of a week as a running day.

38. The method as set forth in claim 1, wherein the information about the service day type designates a weekend as running days.

39. The method as set forth in claim 1, wherein the information about the service day type designates every day as a running day.

40. The method as set forth in claim 12, wherein the information about the service day type indicates a service type for a day.

41. The method as set forth in claim 12, wherein the information about the service day type indicates running days for a transportation route.

42. The method as set forth in claim 12, wherein the information about the service day type designates a day selected from among one or several days of a week as a running day.

43. The method as set forth in claim 12, wherein the information about the service day type designates a weekend as running days.

44. The method as set forth in claim 12, wherein the information about the service day type designates every day as a running day.

45. The apparatus as set forth in claim 22, wherein the information about the service day type indicates a service type for a day.

46. The apparatus as set forth in claim 22, wherein the information about the service day type indicates running days for a transportation route.

47. The apparatus as set forth in claim 22, wherein the information about the service day type designates a day selected from among one or several days of a week as a running day.

48. The apparatus as set forth in claim 22, wherein the information about the service day type designates a weekend as running days.

49. The apparatus as set forth in claim 22, wherein the information about the service day type designates every day as a running day.

* * * * *